United States Patent [19]

Sampson

[11] Patent Number: 4,807,729
[45] Date of Patent: Feb. 28, 1989

[54] BRAKE ROLLER RETAINER

[75] Inventor: Ernest C. Sampson, Fulton, Mich.

[73] Assignee: Eaton Corporation, Cleveland, Ohio

[21] Appl. No.: 119,001

[22] Filed: Nov. 9, 1987

[51] Int. Cl.<sup>4</sup> ............................................. F16D 51/22
[52] U.S. Cl. ................................. 188/330; 188/250 C; 192/107 T
[58] Field of Search ............... 188/329, 330, 332, 338, 188/339, 250 C; 192/78, 93 R, 107 T; 74/569

[56] References Cited

U.S. PATENT DOCUMENTS

| | | | |
|---|---|---|---|
| 3,275,103 | 9/1966 | Lyon | 188/332 |
| 4,503,953 | 3/1985 | Majewski | 188/332 X |
| 4,624,348 | 11/1986 | Williams | 188/332 X |

Primary Examiner—George E. A. Halvosa
Attorney, Agent, or Firm—A. E. Chrow

[57] ABSTRACT

An "H" shaped retainer (60) is provided for retaining trunnions (42) of a brake cam follower roller (18) in open-sided bearing surfaces (20) at the end of spaced-apart webs (34) extending from a brake shoe (8). Retainer (60) features a bridging portion (26) adapted to be disposed intermediate webs (34) and has resilient arms (28) at opposite ends that respectively extend towards and around trunnions (42) and thence towards and past portions (26) and thence outwardly to releasably engage and releasably secure fastener (60) to webs (34) in which, in a preferred embodiment, the ends of the arms are shaped into helical coils (30) that are adapted to extend into openings (44) through each web (34).

10 Claims, 2 Drawing Sheets

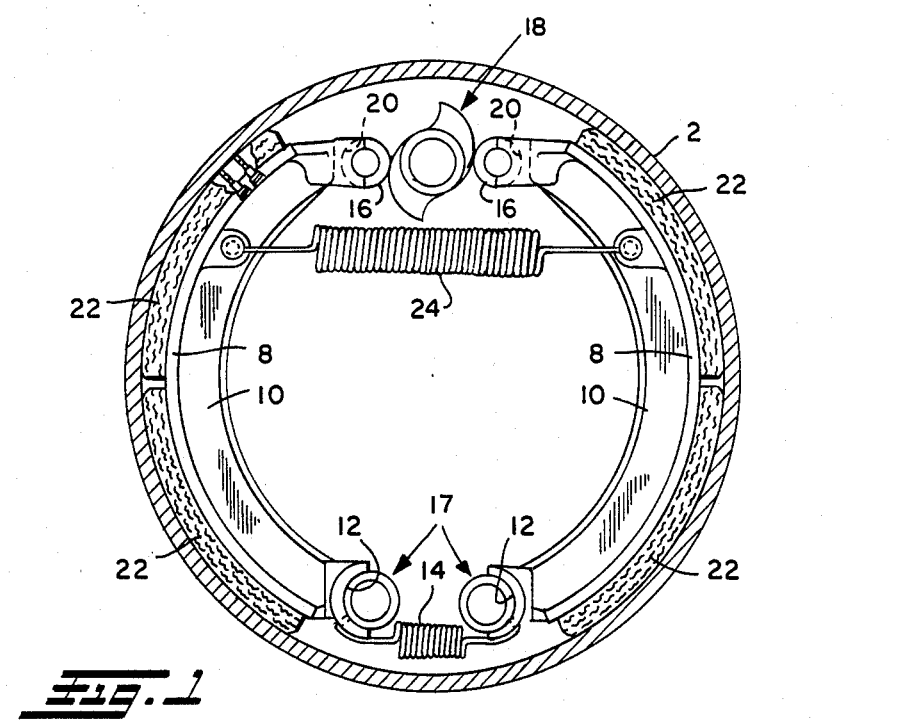
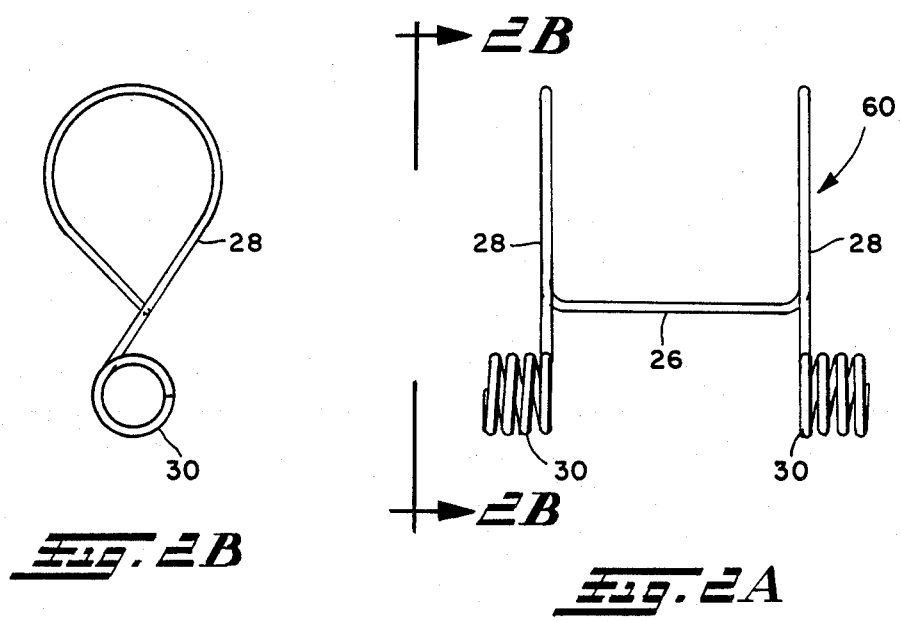

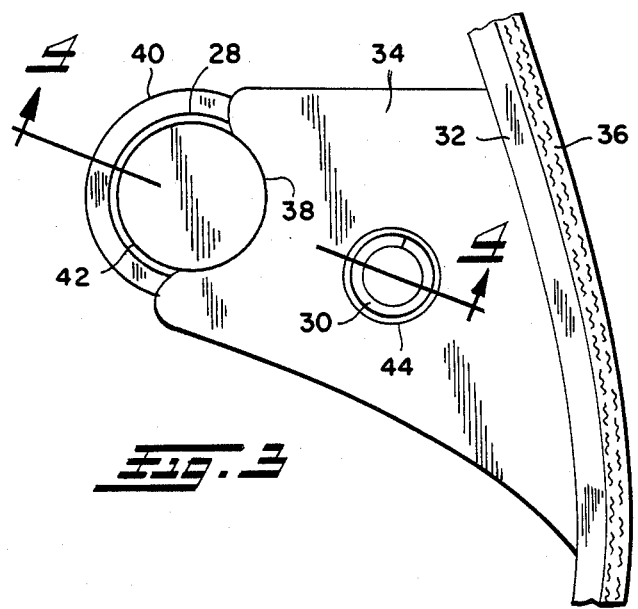
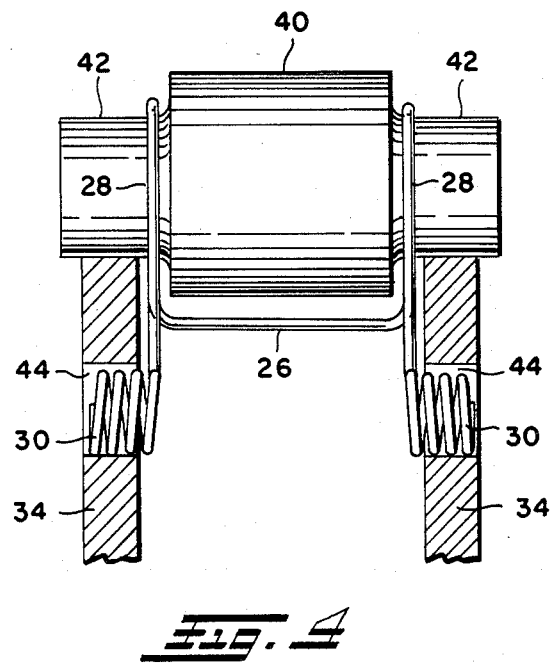

BRAKE ROLLER RETAINER

INTRODUCTION

This invention relates generally to a brake roller retainer and more particularly to a retainer for releasably retaining trunnions of a brake cam follower roller in open-sided bearing surfaces provided on webs of a dual web type brake shoe and the combination of the brake shoe, retainer and follower roller provided thereby.

BACKGROUND OF THE INVENTION

Brakes, particularly vehicular brakes, employing a pair of brake shoes lined with frictional braking material and operative to pivot away from each other and brakingly engage a wheel drum in response to rotation of a cam caused by actuating a brake have been used for many years.

Commonly such brake shoes pivot about common or separate fixed posts at one end and have facing open-sided bearing surfaces at the opposite end in which roller followers are placed and which are resiliently biased against an intermediate rotary cam, commonly an "S" shaped cam, that is adapted to spread the brake shoes apart upon rotation of the cam upon actuation of the brake of which illustrative examples are disclosed in U.S. Pat. Nos. 2,710,076 and 4,206,834, the disclosures of which are incorporated herein by reference.

Initially, because the brake shoes are biased towards each other by springs, the trunnions or cylindrical bearing portions of the cam follower roller were simply placed in open-sided bearing surfaces at the end of webs extending from the brake shoe and held in place by being biased against the cover.

Due to alignment problems of the roller follower between the webs and the possibility of dislodging from the brake shoe bearing surfaces due to wear of either the cam or the roller or to contamination or sticking of the brake shoes to the drum while the cam is rotated to the disengaged position or wear of the frictional braking material, a variety of retainers have been devised over the years for retaining the trunnions of the cam follower roller in the open-sided bearing surfaces provided in the brake shoe webs.

An early example of a "U" shaped retainer for holding the rotary cam follower roller in the brake shoe open-sided bearing surfaces is disclosed in U.S. Pat. No. 3,275,103, the disclosure of which is incorporated herein by reference. Although effective to align the rolling surface of the roller between the cam shoe webs, one would have to employ a tool to reach through openings in the webs and bend tabs before the retainer could be removed from the webs.

Another example of a retainer for retaining cam follower rollers in the open-sided brake shoe bearing surfaces is disclosed in U.S. Pat. 3,469,660, the disclosure of which is incorporated herein by reference. Here, however, it is required that holes be made in the end of each roller trunnion and that arms be welded to the webs carrying pins that enter the holes to retain the roller to the open-sided bearing surfaces which is costly and time consuming.

Further examples of brake roller retainers are respectively disclosed in U.S. Pat. Nos. 4,503,953 and 4,624,348, the disclosures of which is incorporated herein by reference. Both provide a "U" shaped retainer having arms which only partially surround the roller trunnions so that the roller trunnions can be removed therefrom in order to remove the retainer from the webs and which diminishes assurance that the roller trunnions will be held in the open-sided bearing surfaces.

None of the above-described retainers provide a simple and economical way of encircling the roller trunnions completely to insure retention and still be able to easily remove the roller and the retainer from the web without having to first remove the roller from the retainer.

SUMMARY OF THE INVENTION

Accordingly, it is an object of this invention to provide a retainer for releasably retaining trunnions of a rotary cam roller follower in open-sided bearing surfaces on a brake shoe.

It is another object of this invention to provide a retainer for releasably retaining a rotary cam roller follower in open-sided bearing surfaces on spaced-apart webs of a brake shoe that is simple and economical to manufacture and easy to install.

It is yet another object of this invention to Provide a retainer and the retainer in combination with a brake shoe and rotary cam roller follower that is simple and economical to manufacture and which can easily be installed or removed from the brake shoe without having to first remove the roller from the retainer.

BRIEF DESCRIPTION OF THE DRAWINGS

FIG. 1 is a cross-sectional view of an illustrative brake assembly;

FIG. 2A is a front view of a preferred embodiment of a retainer 60 made in accordance with the invention, FIG. 2B is a left side view of retainer 60 of FIG. 2A taken along line 2B—2B;

FIG. 3 is a partial side view of a brake shoe employing retainer 60 of FIG. 3; and FIG. 4 is a partial cross-sectional view taken along line 4—4 of FIG. 3.

BRIEF DESCRIPTION OF SOME PREFERRED EMBODIMENTS

The brake assembly of FIG. 1 includes a pair of opposed brake shoes 8 from which transversely extend spaced-apart webs 10 better shown as webs 34 in FIG. 4. The assembly is of the dual web drum brake type commonly disposed within a rotating brake drum 2 of a vehicular wheel.

Posts or anchor pins 7 are secured to the vehicle frame usually by means of a brake spider and one end of webs 10 brake shoes 8 are provided with open-sided arcuate bearing surfaces 12 that are held against posts 7 by coiled spring 14 secured to both brake shoes 8 as shown in FIG. 1. Brake shoes 8 are operative to pivot about posts 7 away from each other upon actuation of the brake and towards each other upon release of the brake.

Brake shoes 8 have a frictional braking material 22 secured to the side thereof facing towards rotary drum 2 which is urged against and is operative to frictionally brake rotary brake drum 2 upon outward movement of brake shoes 8.

Brake shoes 8 are pivoted away from each other by rotary "S" shaped cam member 18 against which are held opposed cam follower rollers 16 disposed in open-sided arcuate bearing surfaces 20 in webs 10 at the opposite end of brake shoes 8 as shown in FIG. 1.

Coiled tension spring 24 is secured to both brake shoes 8 in a manner effective to urge bearing surfaces 20 against the trunnions of rollers 16 and bias rollers 16 against opposite sides of cam 18 so that clockwise rotation of cam 18, as viewed in FIG. 1 upon actuation of the brake, urges rollers 16 and brake shoes 8 away from each other causing frictional material 22 to engage and frictionally brake rotary brake drum 2. Release of the brake causes cam 18 to rotate counterclockwise enabling spring 24 to urge brake shoes 8 towards each other and release frictional braking material 22 from rotary drum 2.

As previously described, it had been the Practice to rely on spring 24 to hold the trunnions of rollers 16 against open-sided bearing surfaces 20. However, it can readily be seen in FIG. 1 that wear of rotary cam 18 and/or follower rollers 16 or their respective trunnions or frictional braking material 22 could reach a point where rollers 16 could dislodge from the ends of brake shoes 8, as previously described.

Retainer 60 in FIG. 2A is operative to releasably retain the follower roller trunnions in the open-sided brake shoe bearing surfaces such as bearing surfaces 20 of brake shoes 8 of FIG. 1 and as hereinafter described more specifically with respect to FIGS. 3 and 4.

In FIG. 2A, retainer 60 has a bridging portion 26 between arms 28 disposed at its opposite ends. Both arms 28 extend preferably transversely away from one side of bridging portion 26 and in substantial parallel relationship to each which for the orientation shown in FIG. 2A is upwardly. Arms 28 then curve downwardly towards and past bridging portion 26 to respective free-ends on the opposite side of bridge portion 26 which, in the case of retainer 60, are shaped outwardly away from each other and formed into helical coils. As can be seen from FIG. 2A, retainer 60 has a generally 'H' shaped configuration.

As shown along view line 2B—2B of FIG. 2A, the upper loop of both arms 28 in FIG. 2B is shaped to encircle the particular roller trunnions for which the retainer is to be used without inhibiting rotation of the roller. Although retainer 60 is shown as having only a single upper loop, more than one loop for encircling the roller trunnions can be provided if for some reason deemed necessary.

Although preferably shaped adjacent their respective free-ends into helical coils 30, they could also have some other outwardly extending shape between bridging portion 26 and the free-ends adapted to engage and releasably secure the retainer to the brake shoe webs.

Retainers made in accordance with the invention may be made from suitably resilient plastic, metal or composite material but are preferably made from spring steel wire such that the lower portion of arms 28 shown in FIG. 2A will spring outwardly away from each other into the position shown after having been pressed together.

The manner in which retainer 60 is used is shown in FIGS. 3 and 4. In FIG. 3, brake shoe 32, having frictional braking material 36, has a pair of spaced-apart webs 34 extending therefrom having open-sided arcuate bearing surfaces 38 at their respective ends.

Webs 34 are both provided with openings 44 therethrough that are preferably substantially aligned with each other.

Trunnions 42 of cam follower roller 40 are held against bearing surfaces 38 by reason of arms 28 extending from one side of bridging portion 26 and looping about or encircling trunnions 42 at least once and then extending towards and past the opposite side of bridging portion 26 with the outwardly extending coiled ends 30 extending into openings 44 to provide the releasable securement between retainer 60 and webs 34.

As shown in FIG. 4, bridging portion 26 of fastener 60 extends between webs 34 intermediate roller 40 and openings 44. Roller 40 can be easily removed by first spreading the upper loops outwardly away from each other so they can receive the roller trunnions and then releasing the upper loop and pressing the lower portion of arms 28 between bridging portion 26 and their free ends towards each other sufficiently to insert them between webs 34 and then releasing the arms so that they can move resiliently outwardly away from each other with their respective coils 30 entering openings 44 to provide the releasable securement. Roller 40 can be simply removed from coils 34 by squeezing the lower portion of arms 28 between coils 30 and bridging portion 26 towards each other a distance sufficient to enable coils 30 to withdraw from openings 44.

Although the means for releasably securing retainers of the invention to the brake shoe webs preferably comprises the combination of openings in the webs and outwardly extending helical coils adjacent the free-ends of the retainer's arms hereinbefore described, any suitable combination may be used such as, for example, replacing coils 30 with a substantially straight, hooked or outwardly extending loop between the bridging portion in combination with a lip, groove, web or suitable opening on the facing surfaces of the webs adapted to releasably secure the retainer to the brake shoe webs.

What is claimed is:

1. A retainer for retaining trunnions of a brake cam follower roller in open-sided bearing surfaces respectively disposed at ends of a pair of spaced-apart webs extending from a brake shoe, said webs respectively having means on facing surfaces for releasably securing the retainer thereto that are spaced-apart from the bearing surfaces, and said retainer having a generally "H" shaped configuration comprising;

a bridging portion adapted to be disposed between the webs intermediate the trunnions and the means for releasably securing the retainer to the webs;

a pair of resilient arms respectively disposed at opposite ends of the bridging portion, said arms respectively extending towards and encircling the trunnion on the same side of the bridging member as the arm without inhibiting rotation thereof and thence towards and past the bridging portion to respective free-ends thereof; and said arms respectively shaped between the bridging portion and the free-ends to resiliently engage the releasable securing means provided in the web in the same side of the bridging portion as the arm and thereby retain the trunnions in the bearing surfaces.

2. The retainer of claim 1 wherein the means provided on the respective webs for releasably securing the retainer thereto is an opening therein and the respective arms are bent outwardly away from each other to provide a portion thereof operative to enter the opening in the web on the same side of the bridging portion as the arm and thereby retain the trunnions in the bearing surfaces.

3. The retainer of claim 2 wherein the outwardly bent arm portions include the free-ends.

4. The retainer of claim 3 wherein outwardly bent arm portions have a helical configuration.

5. The retainer of claim 2 wherein the opening extends through the webs.

6. In combination, a brake shoe having a pair of webs extending therefrom having respective open-sided bearing surfaces at the ends thereof in which trunnions of a brake cam follower roller are releasably retained by a retainer having a generally "H" shaped configuration comprising;
- a bridging portion disposed between the webs intermediate the trunnions and the means for releasably securing the retainer to the webs;
- a pair of resilient arms respectively disposed at opposite ends of the bridging portion, said arms respectively extending towards and encircling the trunnion on the same side of the bridging member as the arm without inhibiting rotation thereof and thence towards and past the bridging portion to respective free-ends thereof; and
- said arms respectively shaped between the bridging portion and the free-ends to resiliently engage the releasable securing means provided in the web in the same side of the bridging portion as the arm and thereby retain the trunnions in the bearing surfaces.

7. The combination of claim 6 wherein the means provided on the respective webs for releasably securing the retainer thereto is an opening therein and the respective arms are bent outwardly away from each other to provide a portion thereof operative to enter the opening in the web on the same side of the bridging portion as the arm and thereby retain the trunnions in the bearing surfaces.

8. The combination of claim 7 wherein the outwardly bent arm portions includes the free-ends.

9. The combination of claim 8 wherein the outwardly bent arm portions have a helical configuration.

10. The combination of claim 7 wherein the opening extends through the web.

* * * * *